Aug. 22, 1967 A. J. RAFFALOVICH 3,336,797
METHOD OF MEASURING ADHESION STRENGTH
Filed March 5, 1965
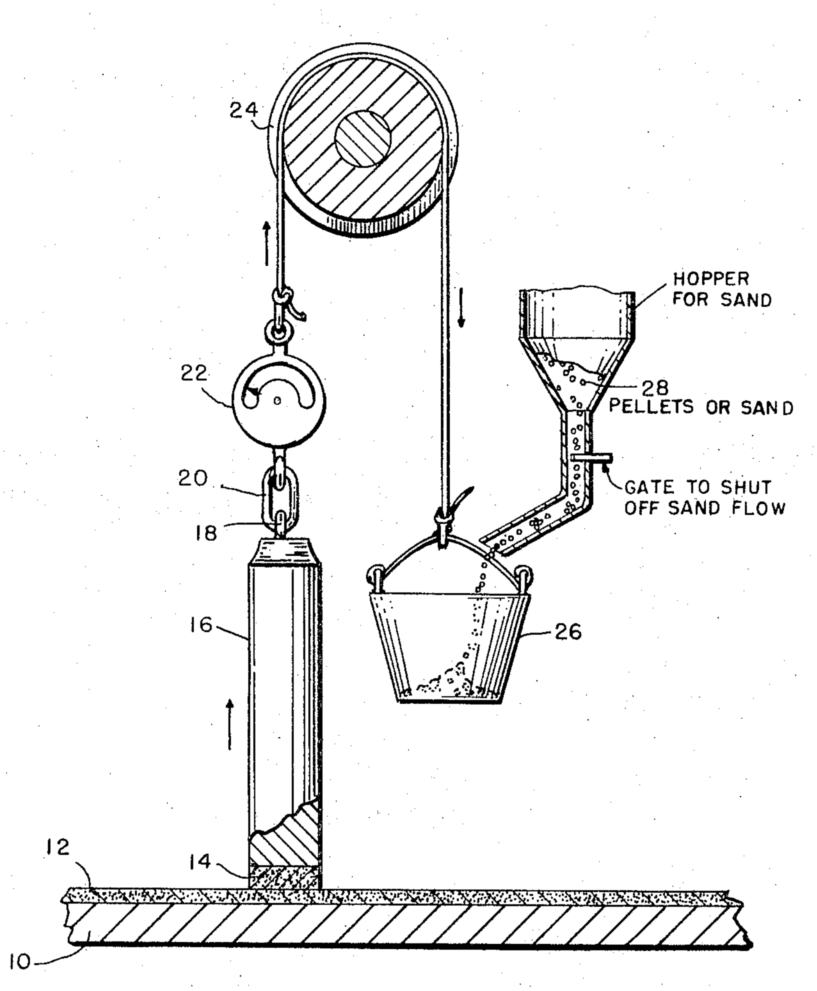
INVENTOR,
AUBREY J. RAFFALOVICH
BY: Harry M. Saragovitz,
Edward J. Kelly,
Herbert Berl &
Julian C. Keppler
ATTORNE

United States Patent Office 3,336,797

Patented Aug. 22, 1967

3,336,797

METHOD OF MEASURING ADHESION STRENGTH

Aubrey J. Raffalovich, Little Silver, N.J., assignor to the United States of America as represented by the Secretary of the Army Filed Mar. 5, 1965, Ser. No. 437,609
6 Claims. (Cl. 73—150)

ABSTRACT OF THE DISCLOSURE

A simple mechanical method is provided for determining the adhesion strength of uniformly thick ultrathin films that have been deposited on a substrate relative to each other and relative to the substrate. The method includes the steps of (1) Firmly placing an adhesive coated end of a relatively short and thin metallic rod onto the films such that the rod is vertically positioned with respect to the films on the substrate and the substrate surface, the adhesive coated end of the rod having a greater adhesion strength to the film in contact therewith than the adhesion strength of any of the underlying films to each other and to the substrate.

(2) Curing the specimen of ultrathin film in contact with the adhesive for at least 3 hours.

(3) Exerting an upward directed force on the rod, the force being vertical with respect to the surface of the films on the substrate and the substrate surface, and the force being increased at a controlled rate until the films separate from the substrate, and (4) Measuring the force required for the separation.

The invention described herein may be manufactured and used by or for the Government for governmental purposes without the payment of any royalty thereon.

This invention relates to a simple method of determining the adhesion strength of a uniformly thick ultrathin film that has been deposited on a substrate relative to that substrate, to a simple method of determining the adhesion strength of uniformly thick ultrathin films that have been deposited on a substrate relative to that substrate, and to a simple method of determining the adhesion strength of one uniformly thick ultrathin film relative to another where the ultrathin films have been deposited on a substrate.

It has been known to determine the adhesion strength of an ultrathin film or films that have been deposited on a substrate to each other and to that substrate by various methods such as scratching or scraping the films. Such methods are undesirable in that the determinations are subject to error due to the influence thereon of unrelated film properties such as hardness—softness, brittleness—flexibility, cohesion, etc.

An object of this invention is to overcome the aforementioned difficulties encountered in previous methods of determining the adhesion strength of uniformly thick ultrathin films that have been deposited on a substrate relative to each other and relative to the substrate. A further object of this invention is to provide a simple mechanical method of determining the adhesion strength of uniformly thick ultrathin films that have been deposited on a substrate relative to each other and relative to the substrate wherein the method is extremely sensitive to the influence of any trace contaminants that may be present on the substrate surface, which is very useful, in turn, in determining the degree of surface cleanliness.

It is now been found that the aforementioned objectives can be attained by the following simple method. According to the method, one or more uniformly thick ultrathin films of about 100 angstroms to 10 microns in thickness are deposited onto a substrate such as glass, ceramic, and the like by any of the well known conventional deposition techniques such as vacuum deposition, sputtering, chemical precipitation from solution, electroplating, vapor plating and the like. An adhesive is then applied by spatula onto the polished and cleaned end of a relatively short and thin metallic rod, preferably made of brass. A very suitable adhesive is Conap Easypoxy Type K22. This is the trade name of Conap, Inc., of Allegany, N.Y., for a two part epoxy resinous air curing adhesive that is simple to use, that contains no solvents that may be trapped in the film or set up stresses in the film under test and that requires no heat that may change the film's characteristics. The adhesive coated end of the rod is then firmly placed on the film and vertically positioned with respect to the film or films on the substrate and the substrate surface and allowed to thicken for 20 minutes. Any surplus adhesive squeezed from under the rod is then removed with a stylus or needle. The specimen of the ultrathin film in contact with the adhesive is then cured by permitting the specimen to stand for at least 3 hours. In the case where only one ultrathin film has been deposited on a substrate, the adhesive used must have a greater bond strength to the film in contact therewith than the bond strength of that film to the substrate. In the case where more than one film has been deposited on a substrate, the adhesive used must have a greater bond strength to the film in contact therewith than the bond strength of any of the underlying films to each other and to the substrate. The adhesion strength of the films relative to each other and relative to the substrate is then measured by determining the upward force vertical with respect to the film or films on the substrate and the substrate surface necessary to separate the films in contact with the adhesive from an underlying film or from the substrate.

The invention can be best understood by referring to the drawing which illustrates the invention.

Referring to the drawing, 10, is a substrate which may be firmly attached to a bench table (not shown). Upon substrate 10 there is deposited a uniformly thick ultra thin film 12 in any manner well known in the art. Adhesive 14 that has been applied to the polished and cleaned end of a relatively short and thin brass rod 16 is firmly placed on the film 12 as illustrated. The specimen of ultrathin film, 12, in contact with the adhesive, 14, is then cured by permitting the specimen to stand for at least 3 hours. The brass rod 16 is provided at its other end with an eyelet 18. A hook-on attachment, 20, connects eyelet 18 with a scale 22. Scale 22 is in turn connected with a pulley including roller, 24 and bucket, 26. An upward directed force that is at all times vertical with respect to the surface of the film 12 on the substrate 10, and substrate 10, itself, is exerted on the brass rod, 16, by slowly pouring sand or pellets, 28 in the form of sand or steel shot into the bucket, 26 at a controlled rate until separation of the film, 12 from the surface of the substrate 10 takes place. Any other suitable means well known in the art may be utilized to measure the vertical force required for separation. In the drawing shown, the force required for this separation is either indicated on scale 22 or indicated by the weight of sand or pellets required to cause separation of the film and corresponds to the adhesion strength of the deposited ultrathin film 12 to the substrate 10.

If multiple layers or films are present on a substrate, failure or film separation will take place at the interface having the weakest strength. If this is the top layer, or layer adjacent to the adhesive coated rod end, one can reposition a clean adhesive coated rod and follow the same procedure as discussed above. If failure takes place at the substrate interface, then one can bond another smaller rod to the bottom layer removed by the first rod and allow to cure the specified period of time. The use of a smaller rod will prevent the adhesive from bridging the two rods. In this case, one rod is affixed to the bench table, or vise in place of the substrate. Both techniques are used if separation takes place at an intermediate layer interface.

The following table represents results obtained with apparatus as shown in the drawing using 7.15 mm. diameter brass rods weighing 2 to 3 grams.

TABLE

| Films | Interface of Failure | Adhesion Strength, lbs./in.² |
|---|---|---|
| Plated Nickel-Iron (3000 A.) over vacuum deposited Gold (600 A.) over vacuum deposited chromium (1000 A.) over mylar. | Cr-Mylar | 8.8 |
| Vacuum deposited Gold (600 A.) over vacuum deposited chromium (1000 A.) over mylar. | Au-Cr | 10.3 |
| Vacuum deposited Gold (600 A.) over vacuum deposited chromium (1000 A.) over glass. | Au-Cr | 10.9 |
| Plated Nickel-Iron (3000 A.) over vacuum deposited copper (2000 A.) over glass. | Cu-Glass | 12.1 |
| Vacuum deposited Platinum over glass | Pt-Glass | 13.8 |
| Vacuum deposited Gold (600 A.) over glass. | Au-Glass | 14.3 |
| Vacuum deposited Cadmium Sulfide over glass. | CdS-Glass | 40.9 |
| Copper+Silicon Monoxide mixed vapors vacuum deposited over glass. | Cu+SiO-Glass | 83.1 |
| Silicon Monoxide vacuum deposited over glass. | SiO-Glass | 98.2 |
| Aluminum vacuum deposited over Silicon Monoxide vacuum deposited over glass. | SiO-Glass | 105.9 |
| Silicon vacuum deposited over glass | Si-Glass | 113.7 |
| Aluminum vacuum deposited over Nichrome vacuum deposited over glass. | | *>170.8 |
| Tantalum sputtered over glass | | *>170.8 |
| Anodic $Ta_2O_5$ over tantalum sputtered onto glass. | | *>170.8 |

*Weight limit of experimental equipment.

Thus, there has been described herein a simple mechanical method of quantitatively evaluating the adhesion forces that bond uniformly thick ultrathin films of about 100 angstroms to 10 microns in thickness to each other and to a substrate onto which they have been deposited. The method offers practical advantage in that it is simple to work with and offers consistent results.

The foregoing description is intended as illustrative of the invention and not in limitation thereof.

What is claimed is:

1. Method of determining the adhesion strength of an ultrathin film that has been uniformly deposited on a substrate relative to that substrate, said method including the steps of (1) firmly placing an adhesive coated end of a relatively short and thin metallic rod on said film such that said rod is vertically positioned with respect to the film on said substrate and said substrate surface, the adhesive coated on the end of said rod having a greater adhesion strength to said film than the adhesion strength of said film to said substrate, (2) curing the specimen of ultrathin film in contact with the adhesive at room temperature for at least 3 hours, (3) exerting an upward directed force on said rod, said force being vertical with respect to the surface of the film on the substrate and said substrate surface, and said force being increased at a controlled rate until separation of the film from the substrate occurs, and (4) measuring the force required for said separation.

2. Method according to claim 1 wherein said adhesive is a two part epoxy resinous air curing adhesive.

3. Method of determining the adhesion strength of a plurality of uniformly thick ultrathin films that have been deposited on a substrate relative to that substrate where the substrate interface is the interface having the weakest adhesion strength, said method including the steps of (1) firmly placing an adhesive coated end of a relatively short and thin metallic rod onto said films such that said rod is vertically positioned with respect to the films on said substrate and said substrate surface, the adhesive coated end of said rod having a greater adhesion strength to the film in contact therewith than the adhesion strength of any of the underlying films to each other and to the substrate, (2) curing the specimen of ultrathin film in contact with the adhesive for at least 3 hours, (3) exerting an upward directed force on said rod, said force being vertical with respect to the surface of the films on the substrate and said substrate surface, and said force being increased at a controlled rate until said films separate from the substrate, and (4) measuring the force required for said separation.

4. Method according to claim 3 wherein said adhesive is a two part epoxy resinous air curing adhesive,

5. Method of determining the adhesion strength of adjacent ultrathin films of a plurality of uniformly thick ultrathin films deposited on a substrate, where the interface between said adjacent films is the interface having the weakest adhesion strength, said method including the steps of (1) firmly placing an adhesive coated end of a relatively short and thin metallic rod onto said films such that said rod is vertically positioned with respect to the films on said substrate and said substrate surface, the coated end of said rod having a greater adhesion strength to the film in contact therewith than the adhesion strength of any of the underlying films to each other and to the substrate, (2) curing the specimen of ultrathin film in contact with the adhesive for at least 3 hours, (3) exerting an upward directed force on said rod, said force being vertical with respect to the surface of the films on the substrate and said substrate surface, and said force being increased at a controlled rate until separation of said adjacent ultrathin films occur, and (4) measuring the force required for said separation.

6. Method according to claim 5 wherein said adhesive is a two part epoxy resinous air curing adhesive.

References Cited

UNITED STATES PATENTS

| | | | |
|---|---|---|---|
| 2,113,725 | 4/1938 | Goldman | 73—150 |
| 3,253,461 | 5/1966 | Blanchard et al. | 73—150 |
| 3,269,176 | 8/1966 | Egitto et al. | 73—150 |

DAVID SCHONBERG, *Primary Examiner.*